Dec. 15, 1931.  A. H. SHOEMAKER  1,836,091
PNEUMATIC TIRE
Filed Aug. 9, 1928

INVENTOR
Alvin H. Shoemaker
BY
Fred C. Matheny
ATTORNEY

Patented Dec. 15, 1931

1,836,091

UNITED STATES PATENT OFFICE

ALVIN H. SHOEMAKER, OF SEATTLE, WASHINGTON

PNEUMATIC TIRE

Application filed August 9, 1928. Serial No. 298,462.

My invention relates to improvements in pneumatic tires and the object of my invention is to provide means on the inside of the tire casing which will tend to flatten the tread portion of the tire casing which comes in contact with the road, thereby bringing into use more tread surface, increasing the durability of the tire, increasing the stability of the tire without detracting from the resiliency of the same, distributing the road shock over a wider tread area and tending to reduce the flexing of the cords around the sides of the tire in the regions where the tire leaves the ground and where the cords are subjected to the greatest flexing.

The usual pneumatic tire is made of approximately cylindrical shape on the inside and when it is inflated the tendency of the internal air pressure is to cause the interior of said tire to assume the shape of a true circle. If the thickness of the casing throughout the tread portion is uniform then the tread will also tend to assume the shape of a true circle and the tendency will be for a very narrow portion of said tread to come in contact with the road and for the central portions of the tread to take the greatest wear, the side portions of the tread further removed from the medial plane coming in contact with the road only as the tire is flattened. It is desirable to have a relatively wide portion of the tread come in contact with the road to assure more wearing surface and more tractive surface and to give greater stability. In attempting to give the tire a flatter tread portion it is now common practice to build up the tread more nearly square on the outside of the casing by thickening the tread material toward the sides of the tire and then tapering or shouldering the thickened tread portions off abruptly so that they merge with the side walls of the tire. This method of obtaining a flattened tread portion by building the same up more or less flat in crosswise directions on the outside of the tire has certain undesirable features. One undesirable feature is that it leaves the tread thinnest in the medial plane of the tire where the tread is subjected to the greatest wear. Another undesirable feature is that it localizes the maximum flexing of the reinforcing cords of the tire at or near the termination of the thickened edges of the tread thus predisposing the tire to failure at this location.

In accordance with my invention I overcome the objections above pointed out by providing means within the tire for causing the tread portion of a tire casing of uniform thickness to assume a flattened condition when it is subjected to internal air pressure.

Figure 1:
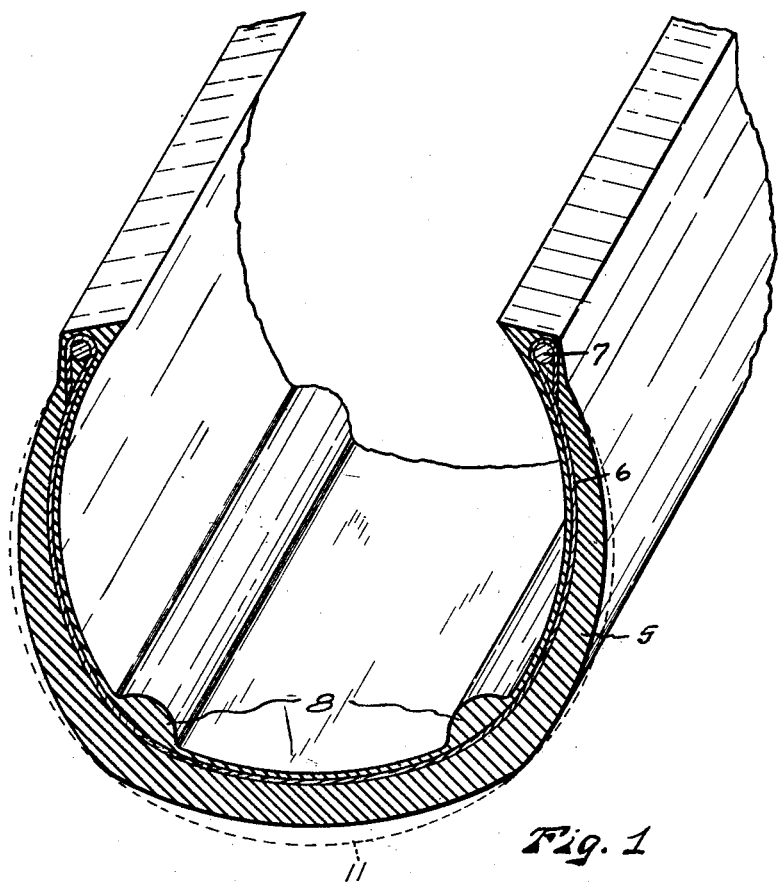

In the drawings Figure 1 is a view in cross section, with parts shown in perspective, of a tire casing constructed in accordance with my invention.

Figure 2:
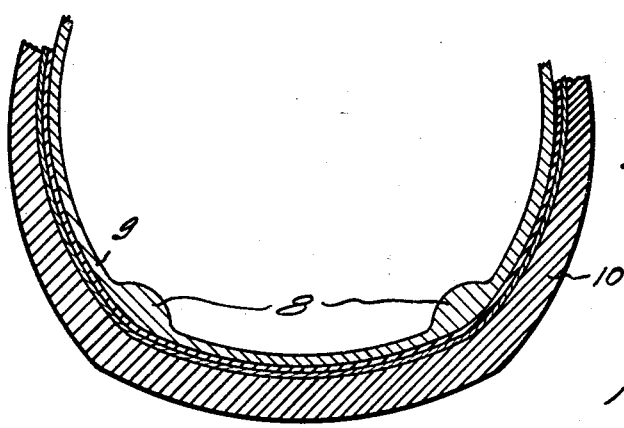

Fig. 2 is a fragmentary cross section of a tire and inner tube in which my invention is incorporated in the inner tube and the tire casing is of standard construction.

Like reference numerals designate like parts throughout the several views.

In Figure 1, I show a tire casing 5, having reinforcing cords 6 embedded therein and connected with non-elastic rings 7 in the bead portions of the tire. In accordance with my invention I provide on the inside of the tire on opposite sides of the medial plane of the tire two spaced apart parallel ribs or bead ridges 8 which are continuous and extend entirely around the tire. These bead ridges are in the nature of thickened portions of material and may be integral with the casing, or attached to the casing, or separable from the casing and may be varied in shape and size depending on the degree or amount of flattening which it is desired to impart to the tread portion of the casing. In Figure 2 I show these bead ridges 8 as embodied in and made a part of an inner tube 9 which may be placed within a tire casing 10 of ordinary construction.

In the operation of tires embodying my invention, the internal air pressure, when the tire is inflated, is exerted equally against all portions of the inner wall of the tire and will tend to cause said inner wall to assume an arcuate shape. This will be true of the rib portions 8 which will tend to conform to the arc of the inner wall of the tire and will be pressed with greater force than adjacent parts of the casing outwardly against the cords thus tending to force the cords outwardly at the location of the beads, and producing a squaring effect of the whole tire. This tends to straighten out or flatten, in a crosswise direction, the tread portion of the tire which lies between the two bead ridges 8 giving to the tire a wider flatter tread portion and insuring greater durability, increased stability, better tractive effect, and more satisfactory performance in general.

When the casing is constructed for use in combination with the bead ridges then said casing may be molded to the squared shape shown in the drawings, but, if said casing is molded of the usual substantially circular cross sectional shape and the beads 8 are used therein then said circular casing will be caused to assume the squared shape with the flattened tread portion as soon as it is inflated. By employing my invention it is possible to make the tread portion of the casing of substantially uniform thickness and yet have said tread portion flatened to afford relatively wide and even contact on the road. It is also possible to avoid excessive flexure of the cords at the sides where the tread merges with the side walls of the tire, which is substantially at the location of the beads 8.

I find from actual tests that the use of the beads not only produces a flattening of the tread portion of the tire but also produces a corresponding flattening of the side walls of the same. The dotted lines 11 in Fig. 1 indicate the approximate positions which the side walls and tread of the tire would assume if the beads 8 were not used therein.

Obviously changes in form, shape and arrangement of the invention may be made within the scope and spirit of the following claims.

I claim:

1. The combination with a tire, of parallel spaced apart annular bead ridges of pliable and elastic material within said tire arranged to produce a flattening of the external tread portion of the tire casing when the tire is inflated.

2. The combination with a pneumatic tire of means for flattening the external tread portion of said tire transversely, embodying two spaced apart annular bead ridges of pliable and elastic material formed as an integral part of the air tight lining of said tire and adapted to be forced outwardly by internal air pressure to impart a flattening effect to the tread portions between said ridges.

3. The combination with a pneumatic tire, having a tread of substantially uniform thickness, of means for flattening the external portion of said tread crosswise embodying two parallel annular bead ridges of flexible material disposed within the tire and spaced substantially equal distances on opposite sides of the medial plane of the tire and arranged to be forced outwardly by internal air pressure thereby reducing the curvature of that portion of the tire tread between said bead ridges.

The foregoing specification signed at Seattle, Wash., this 3rd day of August, 1928.

ALVIN H. SHOEMAKER.